US012809650B2

(12) United States Patent
Li

(10) Patent No.: US 12,809,650 B2
(45) Date of Patent: Nov. 24, 2026

(54) MACHINE LEARNING FOR AUTOMATED NAVIGATION OF USER INTERFACES

(71) Applicant: Google LLC, Mountain View, CA (US)

(72) Inventor: Wei Li, Princeton, NJ (US)

(73) Assignee: GOOGLE LLC, Mountain View, CA (US)

( * ) Notice: Subject to any disclaimer, the term of this patent is extended or adjusted under 35 U.S.C. 154(b) by 212 days.

(21) Appl. No.: 18/579,756

(22) PCT Filed: Sep. 6, 2022

(86) PCT No.: PCT/US2022/042615
§ 371 (c)(1),
(2) Date: Jan. 16, 2024

(87) PCT Pub. No.: WO2023/038888
PCT Pub. Date: Mar. 16, 2023

(65) Prior Publication Data

US 2024/0338234 A1 Oct. 10, 2024

Related U.S. Application Data

(60) Provisional application No. 63/241,561, filed on Sep. 8, 2021.

(51) Int. Cl.
*G06F 9/451* (2018.01)

(52) U.S. Cl.
CPC .................................... *G06F 9/453* (2018.02)

(58) Field of Classification Search
CPC ....................................................... G06F 9/453
See application file for complete search history.

(56) References Cited

U.S. PATENT DOCUMENTS

2007/0033172 A1* 2/2007 Williams .............. G06F 16/907
2020/0019418 A1 1/2020 P K et al.

OTHER PUBLICATIONS

Harries et al. ("DRIFT: Deep Reinforcement Learning for Functional Software Testing", 33rd Deep Reinforcement Learning Workshop (NeurIPS 2019), Dec. 8, 2019, pp. 1-10, XP093006546, Vancouver Canada, DOI: 10.48550/arxiv.2007.08220) (Year: 2019).*
Chen et al: ("From UI Design Image to GUI Skeleton: A Neural Machine Translator to Bootstrap Mobile GUI Implementation", Proceedings of ICSE '18: 40th International Conference on Software Engineering, May 27, 2018 (May 27, 2018), XP093006555, DOI: 10.1145/3180155.3180222) (Year: 2018).*
Eskonen et al: ("Automating GUI Testing with Image-Based Deep Reinforcement Learning", 2020 IEEE International Conference on Autonomic Computing and Self-Organizing Systems (ACSOS), Aug. 1, 2020 (Aug. 1, 2020), pp. 160-167, XP093006561, DOI: 10.1109/ACSOS4961 4.2020.00038 ISBN: 978-1-7281-7277-4) (Year: 2020).*
International Preliminary Report on Patentability for Application No. PCT/US2022/042615, mailed Mar. 21, 2024, 13 pages.
(Continued)

*Primary Examiner* — Seth A Silverman
(74) *Attorney, Agent, or Firm* — DORITY & MANNING, P.A.

(57) ABSTRACT

Provided is a framework to reliably build agents capable of user interface (UI) navigation. For example, example implementations create UI navigation agents with the power of neural networks that learn from human demonstrations.

20 Claims, 16 Drawing Sheets

(56) References Cited

OTHER PUBLICATIONS

International Search Report for PCT/US2022/042615, mailed on Dec. 19, 2022, 2 pages.
Chen et al., "From UI Design Image to GUI Skeleton: A Neural Machine Translator to Bootstrap Mobile GUI Implementation", ICSE '18: Proceedings of the 40th International Conference on Software Engineering, May 2018, Gothenburg, Sweden, 12 pages.
Harries et al., "DRIFT: Deep Reinforcement Learning for Functional Software Testing", arXiv:2007.08220v1, Jul. 16, 2020, 10 pages.
Eskonen et al., "Automating GUI Testing with Image-Based Deep Reinforcement Learning", 2020 IEEE International Conference on Autonomic Computing and Self-Organizing Systems (ACSOS), Aug. 17-21, 2020, pp. 160-167.
Branavan et al., "Reading between the Lines: Learning to Map High-Level Instructions to Commands.", Forty-eighth Annual Meeting of the Association for Computational Linguistics, Uppsala, Sweden, Jul. 11-16, 2010, pp. 1268-1277, 10 pages.
Branavan et al., "Reinforcement Learning for Mapping Instructions to Actions.", Forty-seventh Annual Meeting of the ACL and the Fourth International Joint Conference on Natural Language Processing of the AFNLP, Suntec, Singapore, Aug. 2-7, 2009, pp. 82-90, 9 pages.
Gur et al., "Adversarial Environment Generation for Learning to Navigate the Web.", arXiv:2103.01991v1, Mar. 2, 2021, 14 pages.
Gur et al., "Learning to Navigate the Web.", arXiv:1812.09195v1, Dec. 21, 2018, 12 pages.
Hester et al., "Learning from Demonstrations for Real World Reinforcement Learning.", arXiv:1704.03732v3, Jun. 21, 2017, 14 pages.
Li et al., "Mapping Natural Language Instructions to Mobile UI Action Sequences.", arXiv:2005.03776v2, Jun. 5, 2020, 13 pages.
Li., "Learning UI Navigation Through Demonstrations Composed of Macro Actions.", arXiv:2110.08653v1, Oct. 16, 2021, 13 pages.
Liu et al., "Reinforcement Learning on Web Interfaces Using Workflow-Guided Exploration.", arXiv:1802.08802v1, Feb. 24, 2018, 15 pages.
Osa et al., "An Algorithmic Perspective on Imitation Learning.", arXiv:1811.06711v1, Nov. 16, 2018, 108 pages.
Pomerleau., "ALVINN: An Autonomous Land Vehicle in a Neural Network.", NIPS '88: First International Conference on Neural Information Processing Systems, Denver, Colorado, United States, Jan. 1, 1988, pp. 305-313, 9 p.
Shi et al., "World of Bits: An Open-Domain Platform for Web-Based Agents.", Thirty-fourth International Conference on Machine Learning, Sydney, Australia, Aug. 6-11, 2017, 10 pages.
Toyama et al., "AndroidEnv: A Reinforcement Learning Platform for Android.", https://ar5iv.labs.arxiv.org/html/2105.13231, retrieved on Jun. 10, 2024, 18 pages.

* cited by examiner

MACHINE LEARNING FOR AUTOMATED NAVIGATION OF USER INTERFACES

RELATED APPLICATIONS PRIORITY

This application is based upon and claims the right of priority under 35 U.S.C. § 371 to International Application No. PCT/US2022/042615, filed on Sep. 6, 2022. International Application No. PCT/US2022/042615 is hereby incorporated by reference herein in its entirety International Application No. PCT/US2022/042615 claims priority to and the benefit of U.S. Provisional Patent Application No. 63/241,561, filed Sep. 8, 2021. U.S. Provisional Patent Application No. 63/241,561 is hereby incorporated by reference herein in its entirety.

FIELD

The present disclosure relates generally to machine learning. More particularly, the present disclosure relates to machine learning for automated navigation of user interfaces, such as, for example, learning user interface navigation through demonstrations composed of macro actions.

BACKGROUND

One area of ongoing research in the field of computer science is to build agents capable of human-like actions such as navigating through graphical or textual user interfaces, such as web pages and mobile phone interfaces. Applications of such interface navigation intelligence include but are not limited to automated task completion, such as installing and updating software, tutorial or assistance to humans on how to operate devices, and with the help of natural language processing, following user commands or following user manuals.

In a typical example application, a task can also be associated with an utterance that specifies what sub-task to complete and optionally additional arguments that are needed for the sub-task. For example, in a follow-user-command task, an example utterance could be "search for dolphins here", and the expected behavior for an agent is to locate the search bar on the screen and input 'dolphins' before pressing enter. If a search bar is not visible on the current screen, the agent should perform proper action to reveal it.

In certain existing approaches, input for the automated agent is raw pixel data that depicts the user interface that is presented to the human. In particular, modern user interface systems aim at a smooth user journey by providing sufficient information of the current state and intuitive and easy to access controls to perform desired actions and, therefore, raw pixel data of the user interface is typically sufficient input to the agent. Relying on raw pixel data also avoids the complexity of implementing automation interfaces in each software application while any human-facing application naturally comes with a user interface.

However, directly processing the raw pixel data can be a challenging task, often leading to agent failure. In addition, directly processing the raw pixel data can require significant computational resources because the raw pixel data for a sizeable user interface can include large amounts of data.

Other existing approaches to automated interface navigation can control applications or the whole device through programs that are also referred to as macros. Obviously, the creation of such macros require coding by software engineers and their logics depend on the heuristics generalized by humans. Typically, such heuristics are structured as a sequence of if statements, each handling a group of scenarios.

An example scenario could be: a back arrow appears at the top-left corner of the screen; an example action could be a click; an element could be a button labeled with a back arrow.

However, the use of basic if-then statements is highly brittle and can fail whenever an unexpected or previously unseen state is encountered. When a failed scenario occurs, it requires further software engineering work to either adjust existing if-statements or add new branches. Both the creation and maintenance of these automation macros are inefficient approaches to automation.

SUMMARY

Aspects and advantages of embodiments of the present disclosure will be set forth in part in the following description, or can be learned from the description, or can be learned through practice of the embodiments.

One example aspect of the present disclosure is directed to a computing system configured to navigate user interfaces using machine learning, the computing system comprising: one or more processors; and one or more non-transitory computer-readable media that collectively store instructions that, when executed by the one or more processors, cause the computing system to perform operations. The operations include obtaining, by the computing system, user interface data descriptive of a user interface that comprises a plurality of user interface elements; generating, by the computing system and based on the user interface data, a plurality of element embeddings respectively for the plurality of user interface elements; processing, by the computing system, the plurality of element embeddings with a machine-learned interface navigation model to generate a selected action as an output of the machine-learned interface navigation model, wherein the machine-learned interface navigation model selects the selected action from a predefined action space comprising a plurality of predefined candidate actions; and performing, by the computing system, the selected action on the user interface.

Another example aspect of the present disclosure is directed to a computer-implemented method to train an interface navigation model to navigate user interfaces, the method comprising: obtaining, by a computing system comprising one or more computing devices, user interface data descriptive of a user interface that comprises a plurality of user interface elements; generating, by the computing system and based on the user interface data, a plurality of element embeddings respectively for the plurality of user interface elements; processing, by the computing system, the plurality of element embeddings with the interface navigation model to generate a selected action as an output of the interface navigation model, wherein the interface navigation model selects the selected action from a predefined action space comprising a plurality of predefined candidate actions; determining, by the computing system, a reward based at least in part on the selected action; and modifying, by the computing system, one or more values of one or more parameters of the interface navigation model based at least in part on the reward.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
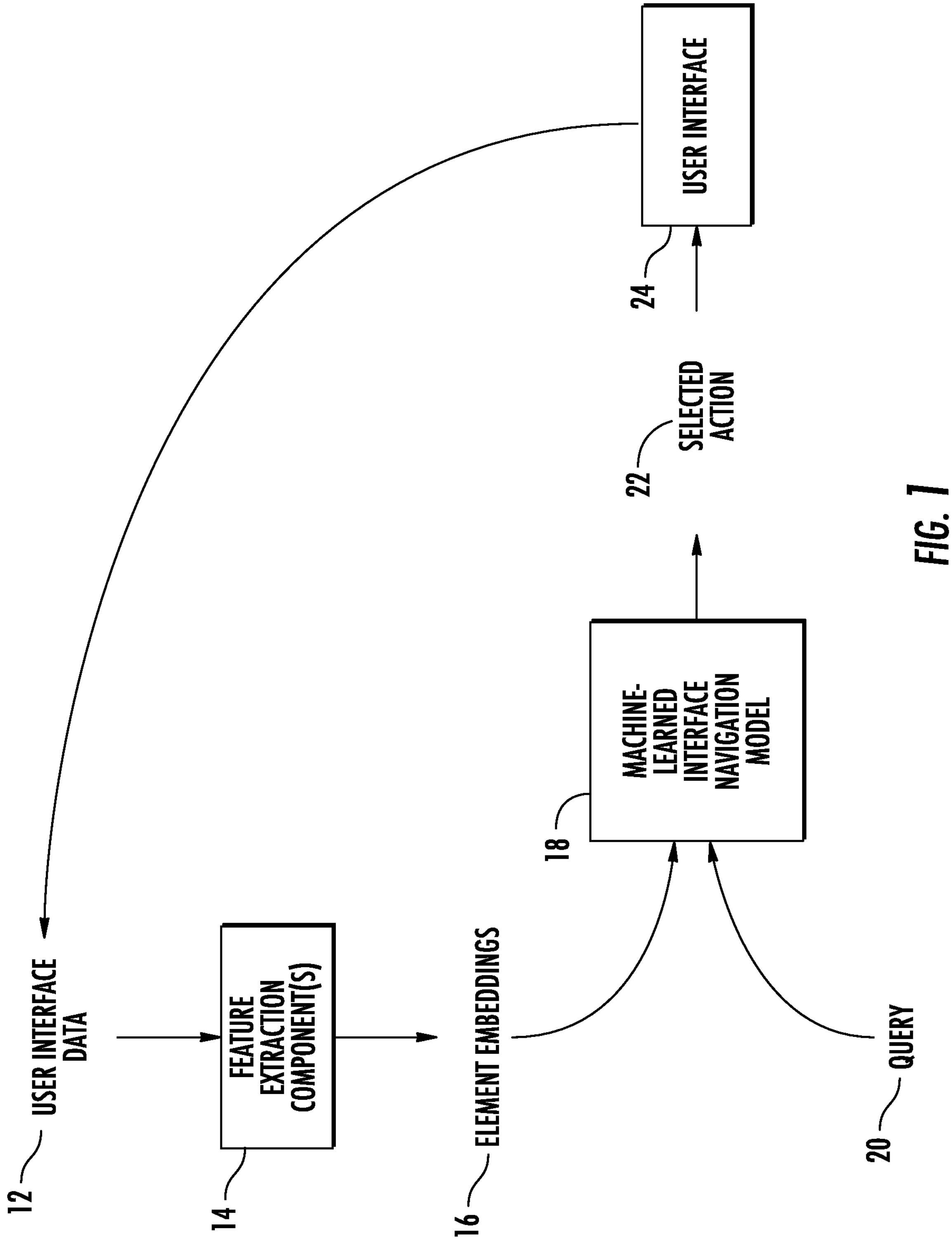
FIG. 1 depicts a block diagram of an example data flow for using a machine-learned interface navigation model to perform automated user interface navigation according to example embodiments of the present disclosure.

Reference numerals that are repeated across plural figures are intended to identify the same features in various implementations.

DETAILED DESCRIPTION

Overview

Generally, the present disclosure is directed to a framework to reliably build agents capable of user interface (UI) navigation. For example, example implementations create UI navigation agents with the power of neural networks that learn from human demonstrations According to one aspect of the present disclosure, the input state space can be simplified from raw-pixels to a set of UI elements extracted from screen understanding, such as via OCR and icon detection. Thus, in some implementations, instead of directly working on raw pixels, the input to the neural network is a collection of UI elements that are extracted from screen understanding preprocessing modules, such as OCR, icon recognition, image detection, and/or other feature extraction approaches. This significantly reduces the state space.

According to another aspect, the output action space can be restricted to the UI elements plus a few global actions. Actions can be customized for tasks and, in some implementations, one or more of the actions can include a sequence of basic operations and status checking techniques. For example, an action issued from the agent can be executed as a program/macro that is composed of a sequence of basic or micro actions with branches controlled by status checking. In some implementations, from the agent's point of view, regardless of the complexity of a macro action, it is atomic. In other words, while a macro action is pending, the agent simply waits for it to finish either successfully or with a failure. This greatly simplifies the action space.

Reduced state space and action space result in simplified neural networks that require fewer training samples and less training time. In particular, by reducing and simplifying the scope of the input and output spaces, processing can be performed faster, training can be satisfactorily performed on a smaller number of training examples, and the trained system can be more robust to unseen data.

With such a design, example implementations of the present disclosure are able to train agents (e.g., deep Q-learning from demonstration (DQfD) or behavior cloning (BC) agents) with just a small number of demonstration episodes. In particular, example implementations include or leverage a neural network architecture that is analogous to the sequence of if-statements in a heuristic agent. The neural nets can in some examples be trained by deep Q-learning from demonstration (DQfD), behavior cloning (BC) algorithms, and/or with other learning algorithms. For example, in example experiments described in the Appendix, with tens of iterations looping over evaluation, demonstration collection, and training, an example agent was able to reach a 97% success rate on the search task in an environment of 80+ apps and websites where initial states and viewing parameters are randomized.

In some implementations, agents can evolve through iterations over agent evaluation, demonstration collection, and agent retraining. Demonstrations can be collected in an error-driven fashion where failed scenarios during evaluation are recorded and reproduced. Thus, in some implementations, only new demonstrations that introduce different behavior in the current iteration of the agent are added to the training samples for the next iteration of the agent. Demonstrations can be collected using the same set of macro actions of the agent.

Yet another aspect of the present disclosure is directed to demonstration augmentation that significantly reduces the required number of human demonstrations. Thus, human demonstrations can be augmented to synthesize more demonstrations utilizing the information specific to demonstrations, such as which UI elements are operated and prior knowledge on which UI elements are more important for UI navigation.

In addition to full-episode demonstrations, some example implementations also provide the option of using screenshot demonstrations that facilitate the coverage of rare cases in training samples. For example, one proposed augmentation approach represents a customization of DQfD to allow demonstrations collected on screenshots to facilitate the demonstration coverage of rare cases.

According to another aspect of the present disclosure, the proposed techniques can perform multiple steps that are referenced by, requested by, or necessary to complete a single utterance or natural language query, even when some of such steps are not explicitly given in the natural language query. In particular, certain alternative approaches may map spans of natural language in multi-step natural language instructions to UI elements. Typically, in these alternative approaches, each UI element to be operated is explicitly mentioned in the instruction. In comparison, example implementations of the present disclosure focus on how an single utterance is executed reliably on various applications with high success rate so that the technique can be productionized. The operation needed is not necessarily included in the utterance. For example, for the utterance "search for something here", an agent may need multiple clicks on various UI elements to dismiss popup ads, to switch pages, and to reveal the search bar.

With reference now to the Figures, example embodiments of the present disclosure will be discussed in further detail.

In some implementations, the trained agent can be deployed on a client device or user device and run "on-device" to navigate interfaces displayed on the device. The trained agent can be included within a particular application to control the application and/or can be included in an operating system or other cross-application platform to control multiple applications. In another example, the trained agent can be offered as a service (e.g., from a server computing device to a remote client device).

The systems and methods of the present disclosure provide a number of technical effects and benefits. As one example, the proposed techniques enable a computer to automatically navigate user interfaces. This represents an improvement in the functionality of a computer itself. As another example, the proposed techniques can enable learning of an agent that operates on a reduced input space, rather than raw pixels, which is more efficient, thereby conserving computational resources such as reduced processor usage, reduced memory usage, etc.

Example Interface Navigation Models

FIG. 1 depicts a block diagram of an example data flow for using a machine-learned interface navigation model 18 to perform automated user interface navigation. In particular, as illustrated in FIG. 1, a computing system can obtain user interface data 12. The user interface data 12 can be descriptive of a user interface 24 that includes a plurality of user interface elements.

In some implementations, the user interface data 12 can include imagery that depicts the user interface 24, such as the raw pixel data of the user interface 24. Additionally or alternatively, the user interface data 12 can include structural metadata descriptive of a structure of the user interface. Structural metadata can include HTML data, document object model (DOM) data, etc.

Based on the user interface data 12, the computing system can execute one or more feature extraction components 14 to generate a plurality of element embeddings 16 respectively for the plurality of user interface elements described by the user interface data 12.

In some implementations in which the user interface data 12 includes imagery of the user interface, generating the elements embeddings can include: performing optical character recognition on the imagery: processing the imagery with an icon recognition model; processing the imagery with an image detection model; and/or other image analysis techniques. In some implementations, the feature extraction component(s) 14 can include a machine-learned embedding generator such as an encoder model such as a Transformer model. In one example, the machine-learned embedding generator can be jointly trained with the model 18 in an end-to-end fashion.

The computing system can process the plurality of element embeddings 16 with the machine-learned interface navigation model 18 to generate a selected action 22 as an output of the machine-learned interface navigation model 18. The machine-learned interface navigation model 18 can select the selected action 22 from a predefined action space that includes a plurality of predefined candidate actions. In some implementations, in addition to or as part of the selected action 22, the model 18 can output a selected element index that identifies one of the user interface elements that is a target or recipient of the selected action 22. In some implementations, in addition to or as part of the selected action 22, the model 18 can output an argument that can be entered or given relative to or as part of the selected action 22.

The computing system can perform the selected action 22 on the user interface 24. In some implementations, the user interface 24 can update based on performance of the selected action 22. The computing system can obtain updated user interface data 12 from the updated user interface 24 and the process can iteratively begin again.

In some implementations, the machine-learned interface navigation model 18 can be further configured to receive data descriptive of a query 20 as an input alongside the plurality of element embeddings 16. The query 20 can indicate a desired result of machine interaction with the user interface 24. In some implementations, the query 20 can be voice data descriptive of a voice input provided by a user. As examples, the voice data can include raw audio data, spectrograms of raw audio data, speech-to-text transcriptions of a voice command, and/or other forms of voice, speech, or audio data.

In some implementations, the selected action 22 can include or be a macro action that includes a sequence of two or more component actions. One example macro action is a focus and type action in which an argument is entered into a data entry field of the user interface.

In some implementations, the query 20 does not reference any of the plurality of predefined candidate actions. Thus, rather than directly aligning requested actions referenced by a query with possible actions, the model 18 can infer which of a number of actions is most appropriate to take to achieve a requested result, even when such specific action(s) are not explicitly identified by the query 20.

In some implementations, the query 20 can be a single instruction. In some of such implementations, the model 18 can be configured to perform a plurality of actions in response to the single instruction. Thus, rather than performing only a single action in response to a single instructions, the proposed model 18 can perform any number of actions to achieve a requested result.

Therefore, the proposed model 18 is able to select any number of actions to achieve a requested result, regardless of whether the appropriate action(s) are explicitly identified by the query 20, and even in cases where the query 20 is a single instruction describing only the desired result and not the component or preliminary steps that may be required so as to achieve the result.

Figure 2:
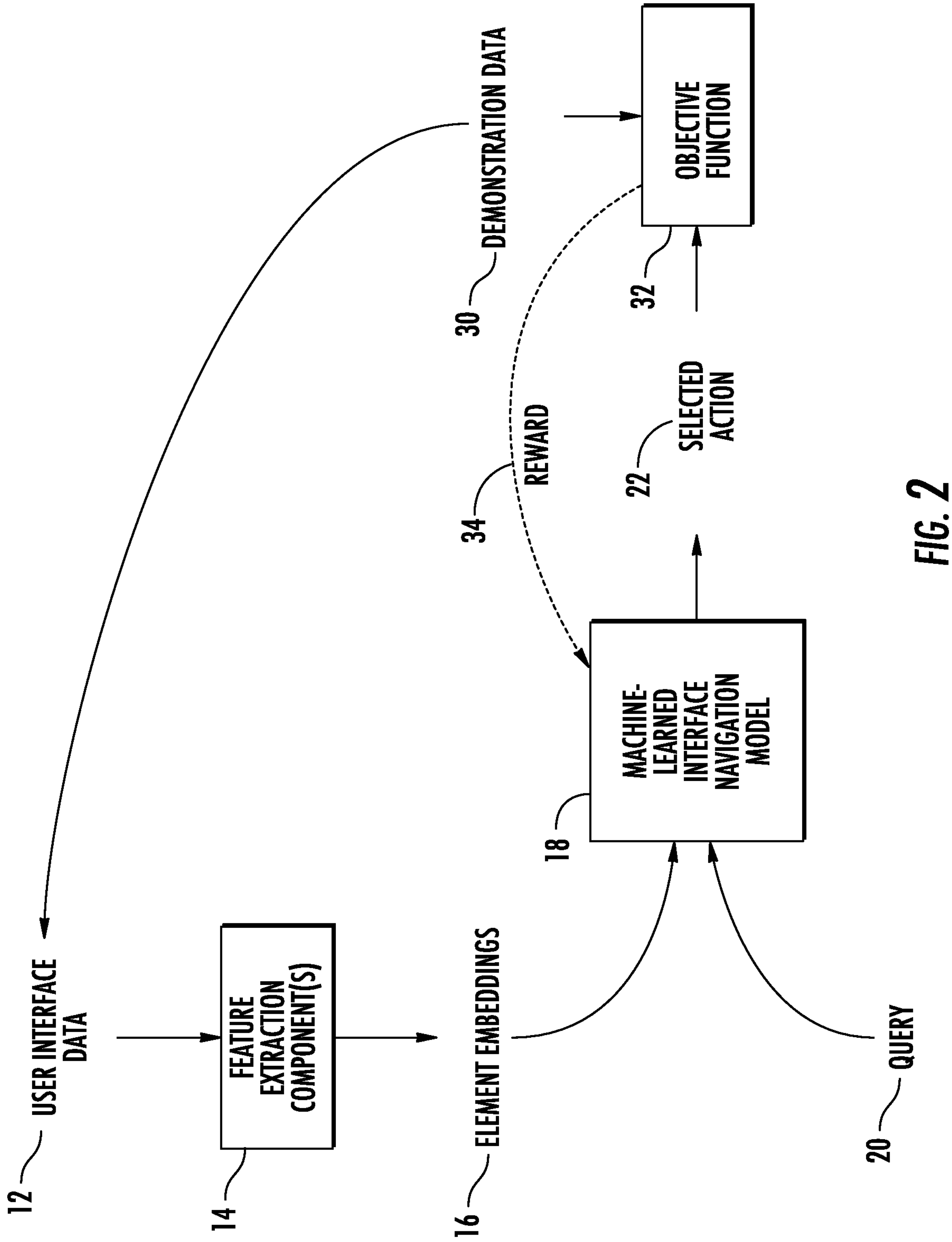
FIG. 2 depicts a block diagram of an example data flow for using a machine-learned interface navigation model to perform automated user interface navigation according to example embodiments of the present disclosure.

FIG. 2 depicts a block diagram of an example data flow for training the interface navigation model 18 to navigate user interfaces. In particular, as illustrated in FIG. 2, a computing system can obtain user interface data 12 from a set of demonstration data 30. The user interface data 12 can be descriptive of a user interface 24 that includes a plurality of user interface elements.

Based on the user interface data 12, the computing system can execute one or more feature extraction components 14 to generate a plurality of element embeddings 16 respectively for the plurality of user interface elements described by the user interface data 12.

The computing system can process the plurality of element embeddings 16 with the machine-learned interface navigation model 18 to generate a selected action 22 as an output of the machine-learned interface navigation model 18. The machine-learned interface navigation model 18 can select the selected action 22 from a predefined action space that includes a plurality of predefined candidate actions. In some implementations, in addition to or as part of the selected action 22, the model 18 can output a selected element index that identifies one of the user interface elements that is a target or recipient of the selected action 22. In some implementations, in addition to or as part of the selected action 22, the model 18 can output an argument that can be entered or given relative to or as part of the selected action 22.

An objective function 32 can compare the selected action 22 to the demonstration data 30 (e.g., a humanly-selected action included in the demonstration data) to generate a reward 34. One or more values of one or more parameters of the model 18 can be modified based on the reward 34 (e.g., via backpropagation of the reward 34 and objective function 32 through the model 18).

Example Screen Representation

Figure 3:
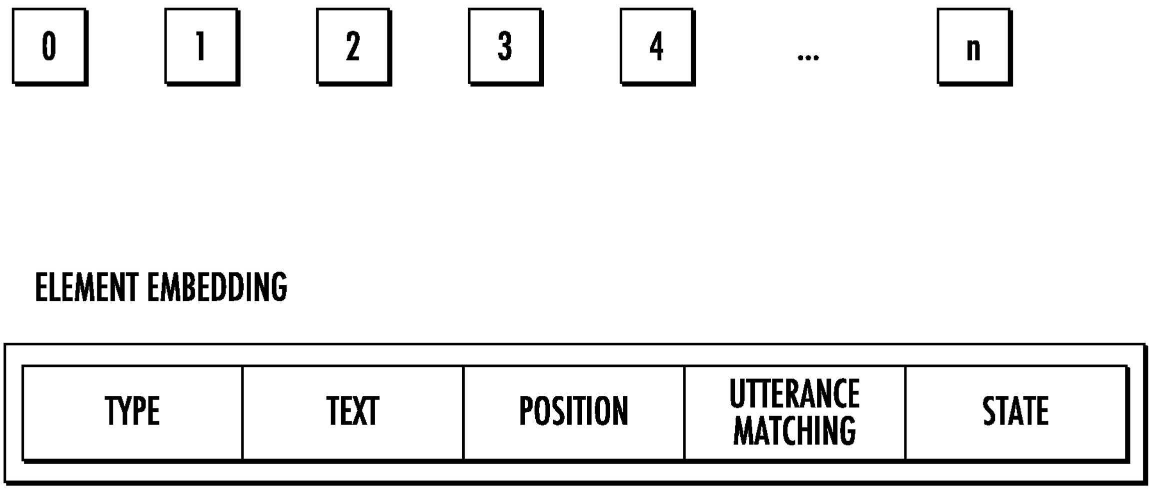
FIG. 3 depicts a block diagram of an example user interface representation according to example embodiments of the present disclosure.

FIG. 3 depicts a block diagram of an example user interface representation according to example embodiments of the present disclosure. In particular, in some implementations, each screen can be represented as a set of UI elements. In FIG. 3, the numbered green boxes represent UI elements. In some implementations, each UI element can be encoded by concatenating various embeddings of the attributes associated with the element, including its type, description text, screen position, etc. Some UI elements, such as radio buttons and checkboxes can also have states.

The screen representation can be viewed as an abstract structure and is flexible to handle different approaches for obtaining the embeddings. In one example, it can be assembled from the output of screen understanding components that take raw pixels as input, such as OCR, icon recognizers, and/or image detectors. Additionally or alternatively, it can be simplified from the DOM tree (e.g., in web navigation use cases). Besides, accessibility trees, if available, may be used to fully or partially populate the data of screen representations.

Example Action Space

Figure 4:
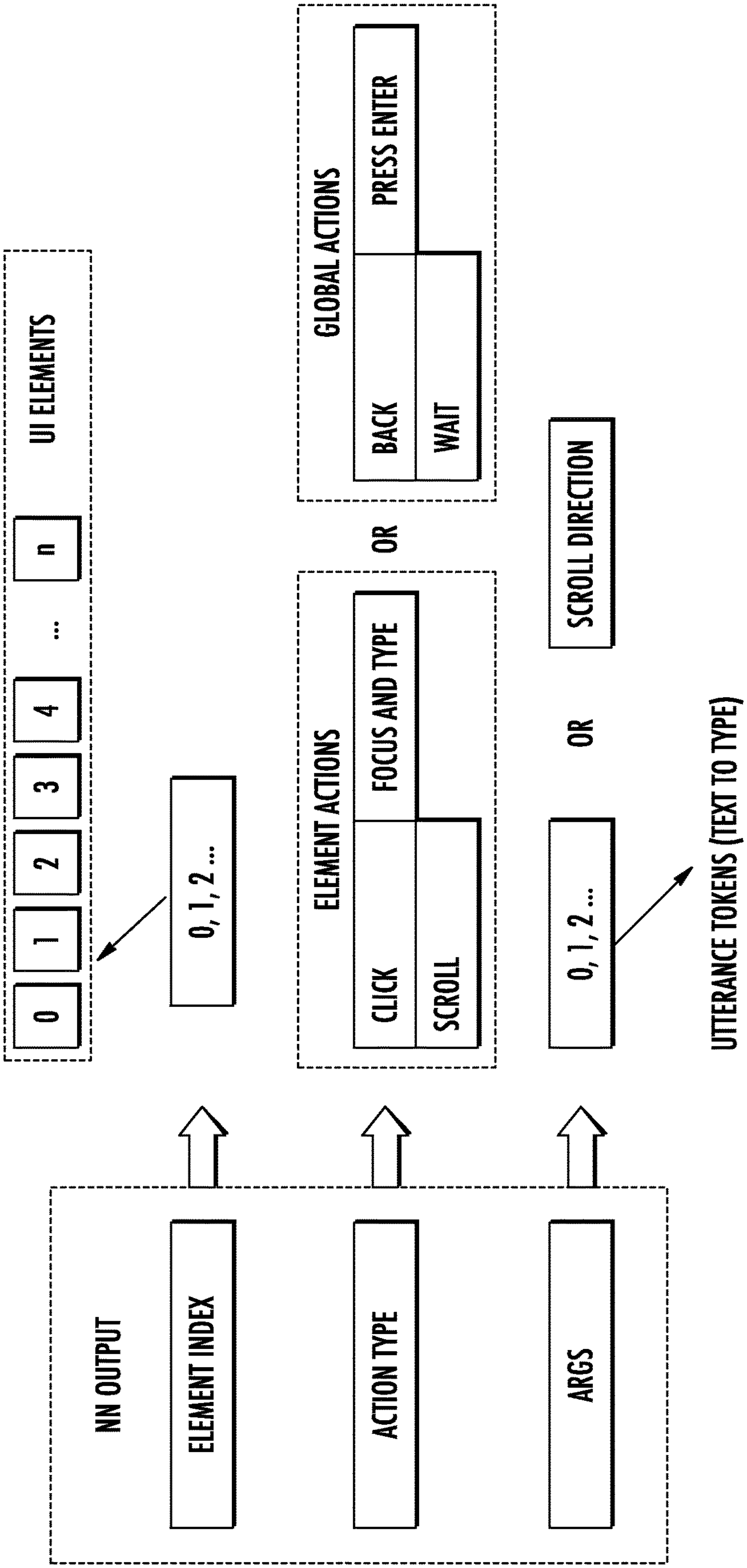
FIG. 4 depicts a block diagram of an example action space according to example embodiments of the present disclosure.

FIG. 4 depicts a block diagram of an example action space according to example embodiments of the present disclosure. In particular, some example implementations support multiple groups of actions, including, as examples:

- Element action: an action that is performed on an individual element. Examples are: click, focus_and_type, scroll.
- Global action: an action that is not pertinent to any element. Examples are: wait, back, press enter.

The output of the agent can define what action will be performed, including, as examples:

- Element index: identifies which element the action will be applied to.
- Action type: specifies which type of action. The types include both element actions and global actions.
- Action args: some types of actions require additional arguments. For example, for a scroll action, its direction can also be provided. Unless there is only one option, a focus_and_type can be supplemented with an index into an array of phrases that can be entered.

Example Model Architecture

Figure 5:
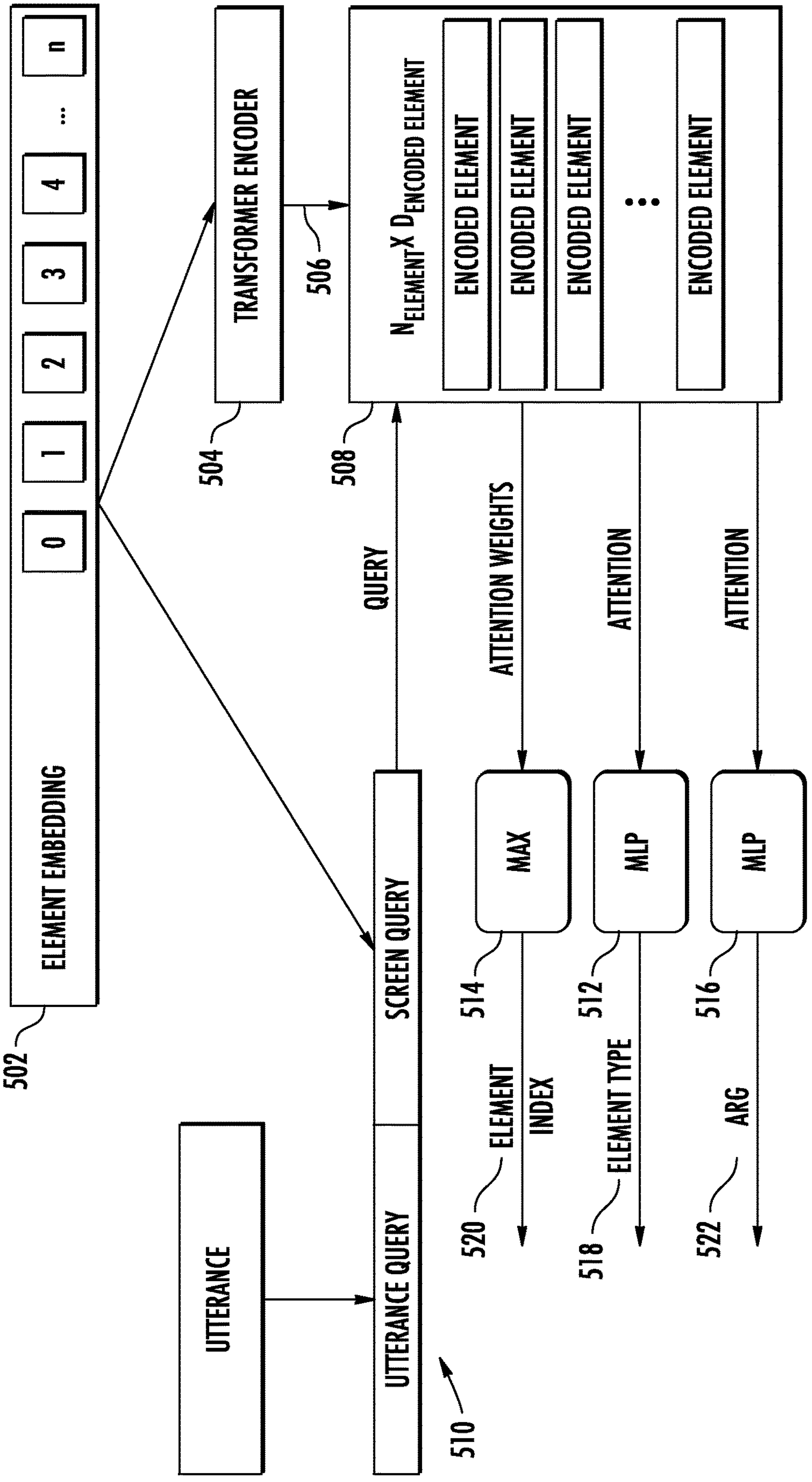
FIG. 5 depicts a block diagram of an example machine-learned interface navigation model according to example embodiments of the present disclosure.

FIG. 5 depicts a block diagram of an example machine-learned interface navigation model according to example embodiments of the present disclosure.

In particular, a screen representation of a set of element embeddings 502 can be encoded by a first transformer encoder 504 to generate a plurality of first intermediate embeddings 506.

A second attention model 508 can perform attention between a query embedding 510 and the plurality of first intermediate embeddings 506 to generate one or more second intermediate embeddings (not explicitly shown).

One or more prediction heads can process the one or more second intermediate embeddings to generate one or more predictions. For example, as shown in FIG. 5, the model can include three prediction heads. An action prediction head 512 can be configured to select a selected action 518 from an action space including a plurality of predefined candidate actions. An element prediction head 514 can be configured to output an element index 510. An argument prediction head can be configured to output an argument 522.

The first intermediate embeddings 506 output by the first transformer encoder 504 can have the same number of entries as the number of UI elements. Each entry can be the encoding of the corresponding UI element plus its attention over all the UI elements on screen, including itself.

In order to select which UI element to perform the next action, a query vector 510 can be created from the concatenation of the utterance and an aggregate of the screen representation 502 (such as the sum, average, or max of the element embeddings) for an attention over encoded elements (i.e., the first intermediate embeddings 506). The max of the attention weights can be used to pick the element index 520 and the attention (i.e., the second intermediate embeddings) can be passed through two independent MLP layers 512 and 516 to produce action type 518, and action arguments 522.

Thus, in some implementations, there are multiple output heads from the neural network, while for training to apply gradient descent, the loss function should produce a single scalar variable. A natural choice is to pick the overall loss as the sum of the losses of each output head. The multiple output heads are not independent of each. For example, if the action is a global action, the element index is ignored, and the loss contributed from the head of the element index should not affect the weights of the neural net. Some example implementations use the following formula to compute the loss:

$$\text{loss}=\text{loss}_{action\ type}+\text{loss}_{element\ index}*\text{mask}_{element\ index}+\text{loss}_{action\ arg}*\text{mask}_{action\ arg}$$

Some example implementations mask out unneeded losses, e.g., using the equations below:

$$\text{mask}_{element\ index}=\begin{cases}1 & \text{if element action}\\ 0 & \text{otherwise}\end{cases}$$

$$\text{mask}_{action\ arg}=\begin{cases}1 & \text{if action requires argument}\\ 0 & \text{otherwise}\end{cases}$$

The example neural network shown in FIG. 5 can be considered as a scoring system. For any given screenshot, all the UI elements are scored, and the one with the highest score is selected for possible action. Note that due to attention in the transformer encoder 504, for any UI element, its relationship to all the UI elements on screen are encoded. This makes it possible for the neural net to include all the relevant combinations it encounters during training as states. The neural net maintains a ranking list of all these states, while each state maps to a UI element, an action type, and an action argument. The ranking list is in some ways analogous to the ordered if-statements of the heuristic agent. We can imagine that the neural network traverses the ranking list at inference time in descending order. If a state has a match on the current screen, the corresponding UI element, action type, and action argument are selected.

Example Macro Actions

In some example implementations, some possible agent actions can be a composite of a sequence of low level actions. The low level actions can be referred to as micro actions, and the composite actions can be referred to as macro actions. Although viewed as an atomic step, a macro action can be controlled by a program, also called a macro, and can involve arbitrary logic. Using macro actions has two advantages:

Fewer steps to complete a task than using micro actions as each macro action contains multiple micro actions. This reduces the complexity that an agent faces.

During the execution of an atomic macro action, changes to the screen are not necessarily visible to the agent, and do not necessarily contribute to the state space. In particular, a macro action can be designed to skip transitional screens and can finish when the screen becomes stable, or a timeout is reached when dealing with dynamic screens such as playing a video.

Figure 6:
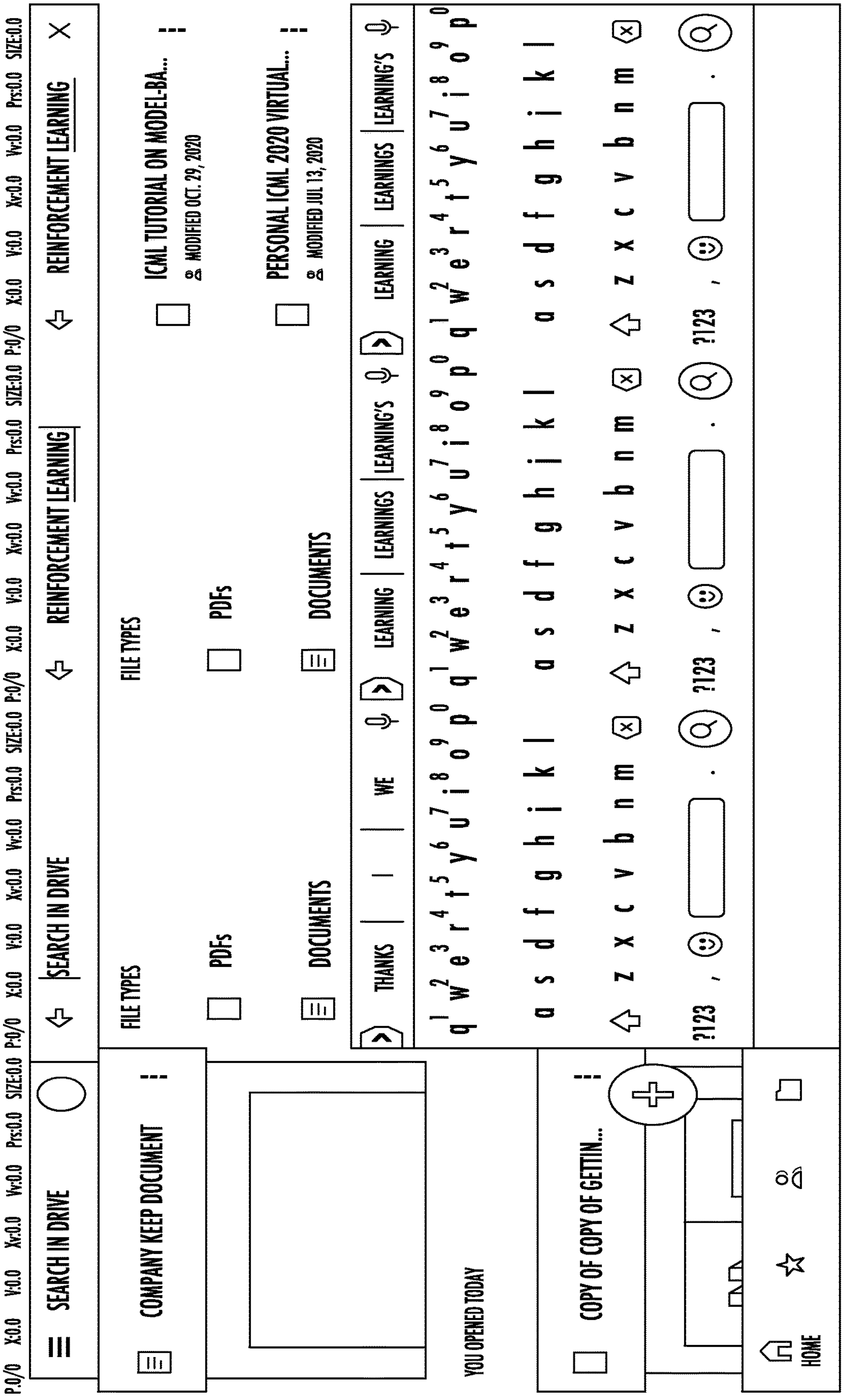
FIG. 6 depicts a graphical diagram of an example macro action according to example embodiments of the present disclosure.

FIG. 6 depicts a graphical diagram of an example macro action according to example embodiments of the present disclosure. In particular, the image sequence of FIG. 6 shows the four steps of the focus_and_type action on Android that enters text in the field labelled "Search in Drive":

1. Click the field to obtain focus.
2. Wait for the blinking cursor to appear.
3. Input text.
4. Press enter and wait for the screen to change.

Another example aspect of the present disclosure is directed to a blinking cursor detector. If the changed pixels in contiguous screenshots form a vertical bar, a candidate cursor is found. If a candidate repeatedly appears at the same location, a blinking cursor is found. For efficiency, the search region can optionally be restricted to the text input field, and vertical bars of unreasonable width or height can be filtered out.

An example agent action of click can be composed of two steps:

1. Send a down action to a device or emulator.
2. Wait for the expected screen change.

Generally, an expected screen change after clicking a button is that large amount of pixels change. Clicking a radio button or checkbox does not comply with this assumption and can rely on a dedicated state recognizer.

In some implementations, when using screen understanding to generate screen representation, each macro action can finish with one of the following states:

SUCCESS

FAILURE

CANCELATION

The meaning of the first two states are clear. The state of CANCELATION is designed to handle the delay of screen understanding. When an agent is about to perform an action on a UI element, it is possible that the UI element has changed (moved or disappeared) in the latest screen. If it is true, the action can be cancelled and the agent can pick a new action based on the latest screen. To detect whether a UI element has changed, the screenshot from which the element is recognized can be cached and can be compared with the latest screenshot within the bounding rectangle of the element. The latest screenshot can be fed for comparison without the computation of screen understanding.

Typically, when screen representation comes from a DOM tree or accessibility tree, an action always succeeds. Besides, after a reference to an element is obtained, an action can be applied no matter where the element moves. The blinking cursor detection is also unnecessary because the type of any text input field is known with no risk of mistake as it is part of the attributes of the corresponding tree nodes.

Example Evaluation, Demo Collection, and Training

Figure 7:
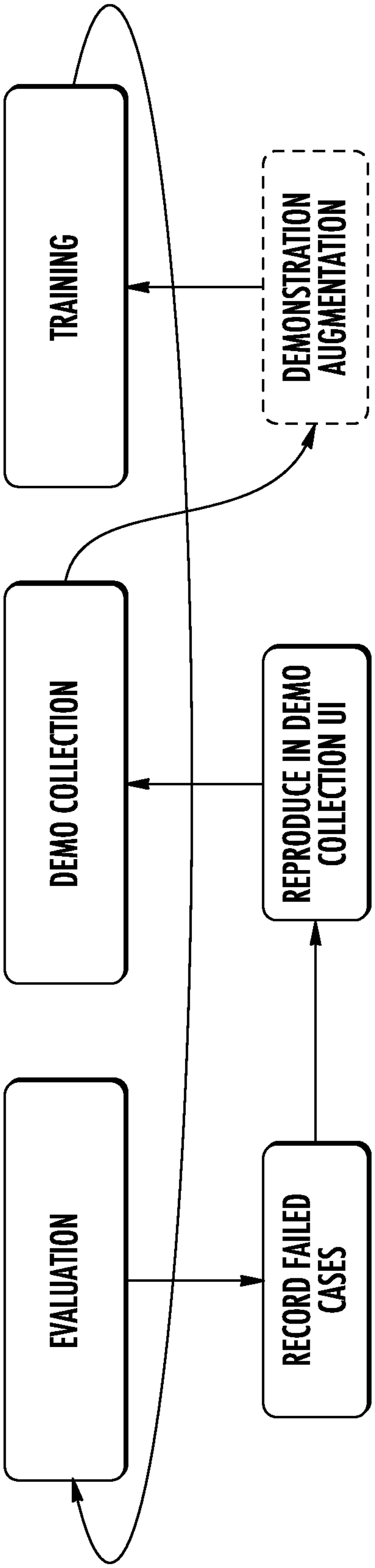
FIG. 7 depicts a block diagram of an example loop for building user interface navigation agents according to example embodiments of the present disclosure.
Figure 8A:
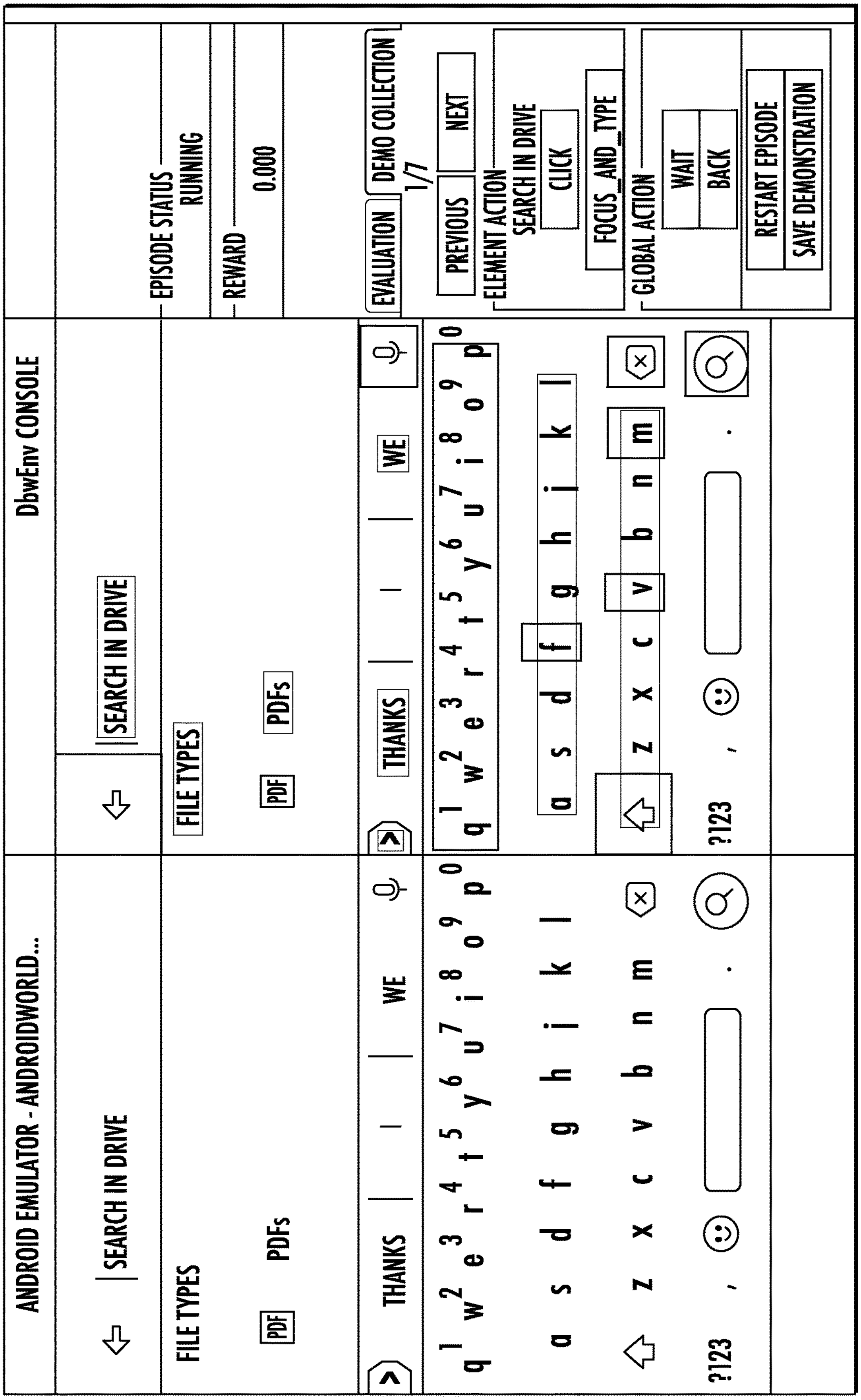
FIGS. 8A-F depict a graphical diagram of an example demonstration collection according to example embodiments of the present disclosure.
Figure 8B:
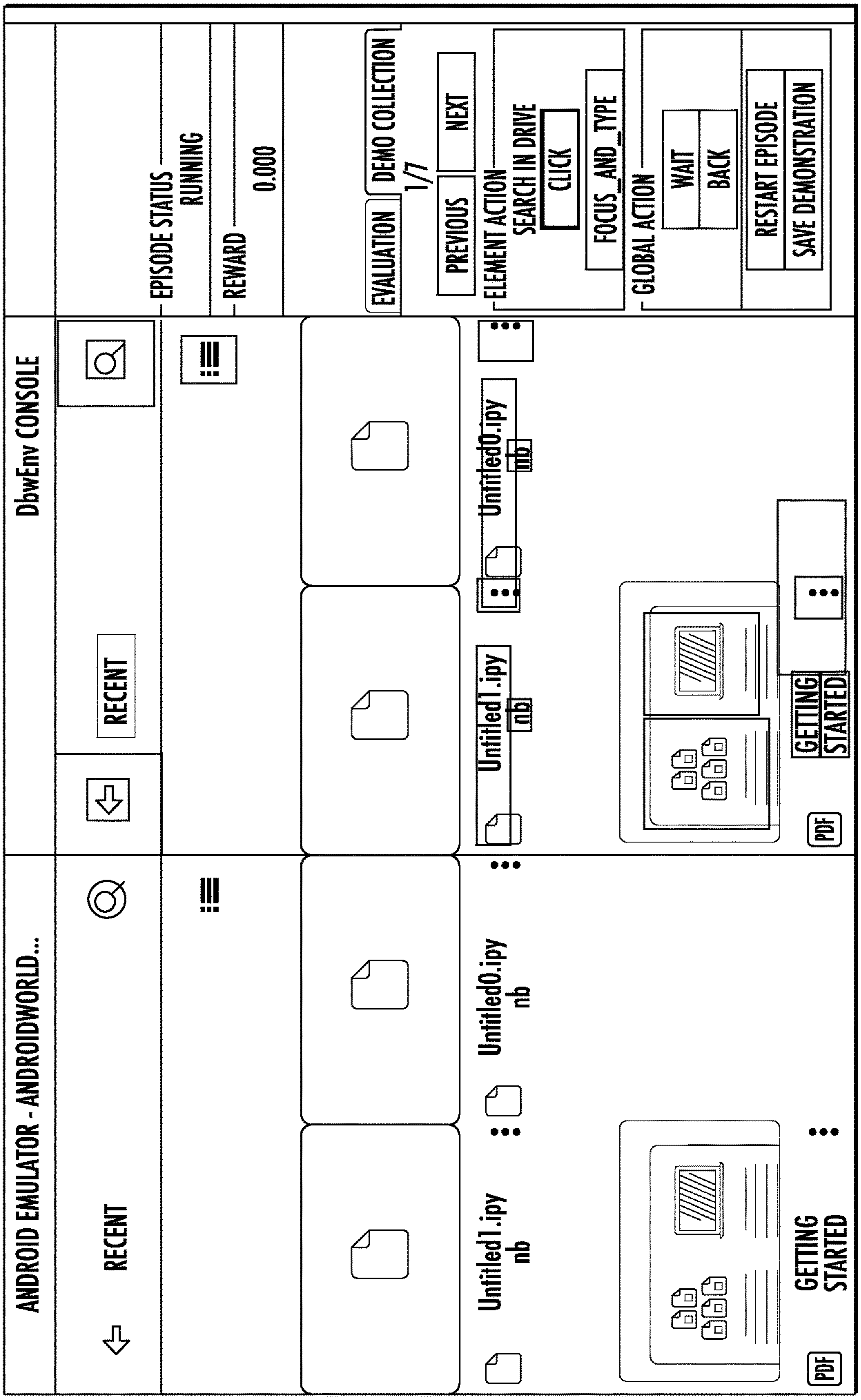
Figure 8C:
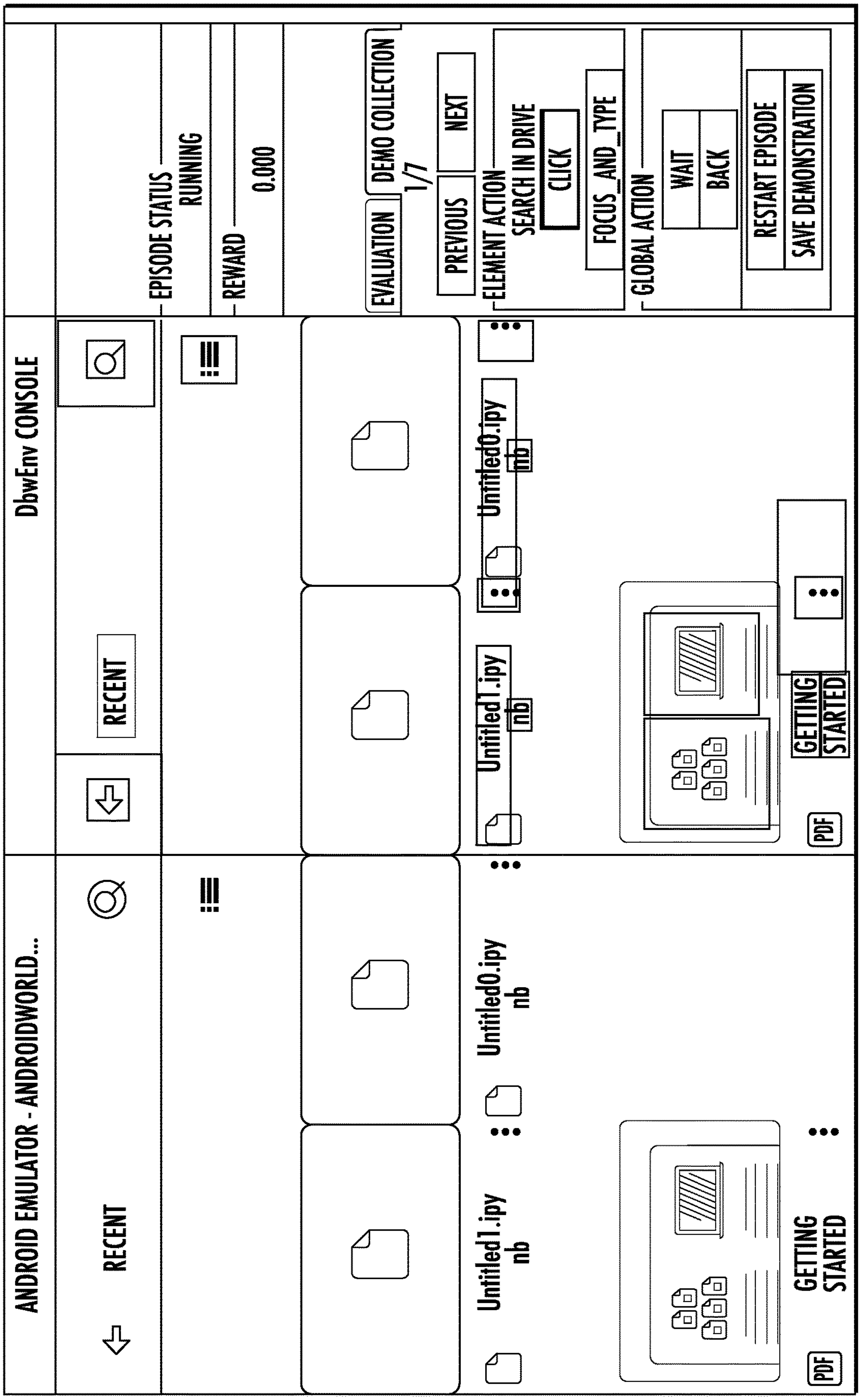
Figure 8D:
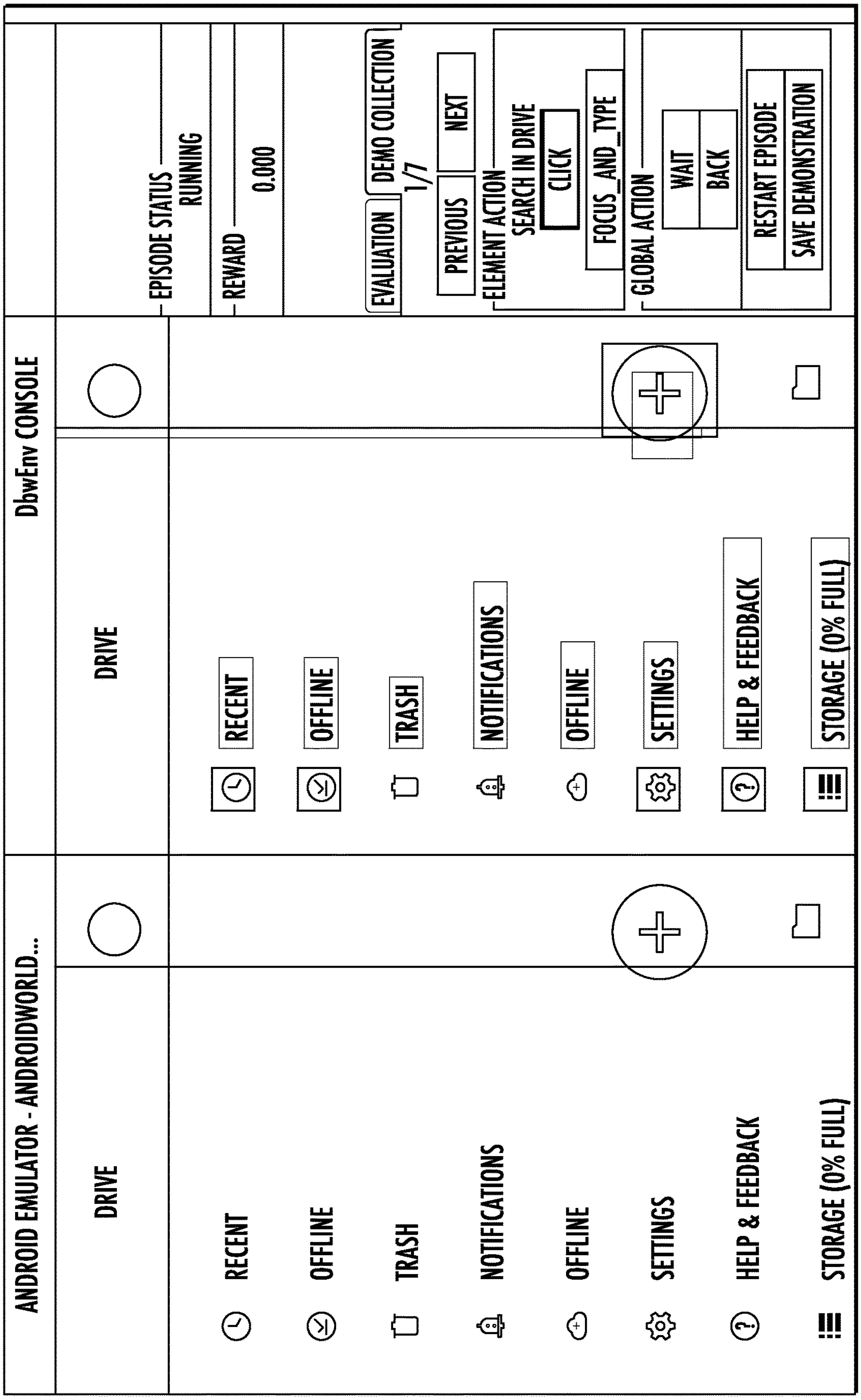
Figure 8E:
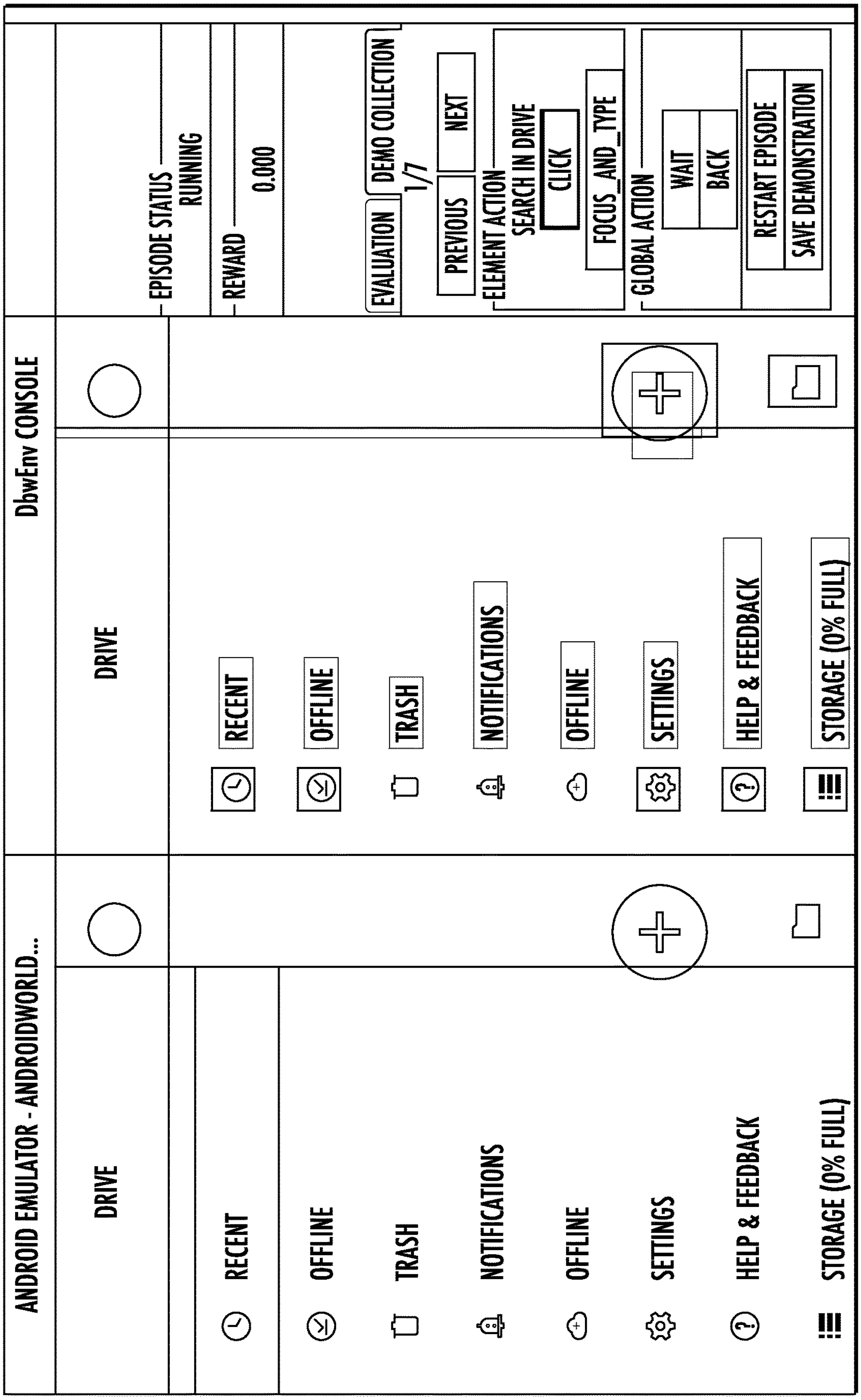
Figure 8F:
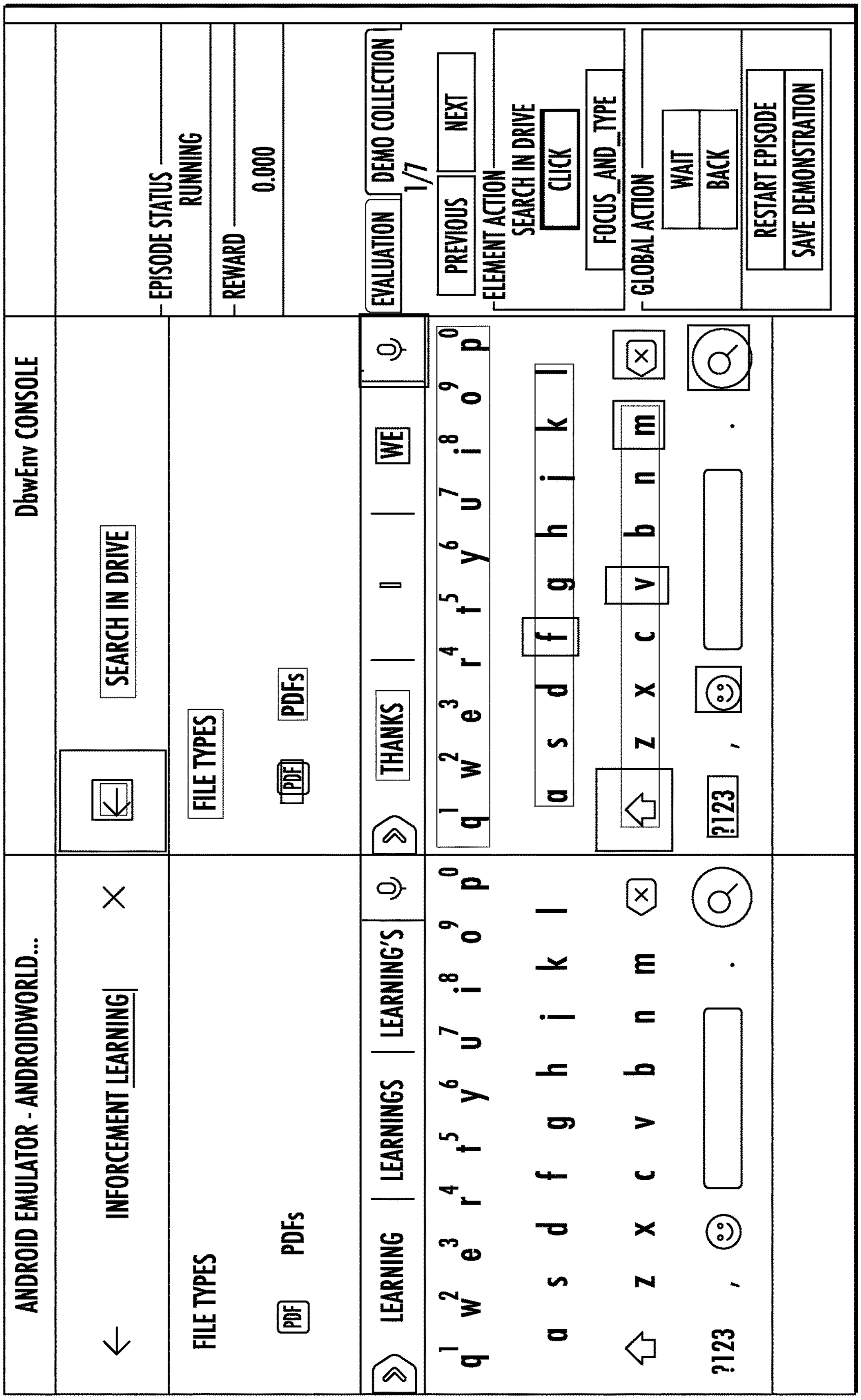

FIG. 7 depicts a block diagram of an example loop for building user interface navigation agents according to example embodiments of the present disclosure. In particular, in some implementations, a UI navigation agent can be built through iterations looping over evaluation, demonstration collection, and training.

In some implementations, during an evaluation session of an agent, the configurations of all the failed cases are recorded. Then those failed cases are reproduced in the GUI of the demonstration collection and new demonstrations from humans are added to the pool of training samples if those demonstrations have different behavior than the current version of the agent. In short, demonstration collection is error-driven. Next, a new version of the agent is trained with all the demonstrations, and the loop repeats.

FIGS. 8A-F depicts a graphical diagram of an example demonstration collection according to example embodiments of the present disclosure. In particular, the GUI of the demonstration collection is shown in the FIGS. 8A-F.

In each FIG. 8A-F, the left portion is the screen of an Android emulator. The middle portion is the copy of the screen annotated with UI elements; icons highlighted by blue boxes and texts highlighted by green boxes. Red boxes indicate selected UI elements that are the targets for the next action. For an element action, the text of the action type is overlaid on the element: for an global action, the text in the middle of the screen. The right is the control panel that has buttons to trigger agent actions.

The figures show the process that a human performs 3 macro actions:

1. Click "Recent": select the text label "Recent" on the annotated screen and click the "click" button on the control panel.
2. Click the search icon: select the search icon on the annotated screen and click the "click" button on the control panel.
3. Focus_and_type on "Search in Drive": select the text label "Search in Drive" and click the focus_and_type button on the control panel.

Note that the humans rely on the macro actions during demonstration collection. It is possible that they may operate differently if they directly manipulate the emulator. The advantage is clearly that the actions in human demonstrations are in the exact same action space as that of the learning agent. There is no need to recognize and convert a sequence of low-level actions to a macro action, which itself is a challenging task.

For UI navigation, it is possible that there are multiple solutions for a task. It is desirable for the agents to be able to complete tasks successfully with any one of the solutions.

It is not necessary to require an agent to always pick the optimal solution or be consistent with any operation style.

Example Demonstration Augmentation

Obviously, not all the UI elements have the same importance for UI navigation. Certain elements are frequently operated for given tasks, while others are irrelevant. In particular for UI navigation, elements that help navigating, such as the back button, the home button, the menu button, and the search icon for a search task, are important. Whereas the detailed information, such as the contents of an email, or the body of a news article can in some examples be ignored.

A demonstration not only teaches an agent what actions to take for given states, but also provides information on which UI elements are more important for the task. Based on this observation, example implementations of the present disclosure can perform one or more demonstration augmentations. As examples, demonstration augmentation proposed by the present disclosure can include:

1. Classify all UI elements into two groups: critical and irrelevant. Critical UI elements can include elements receiving actions in the current step, all the icons, and common UI navigation elements. Irrelevant UI elements can include all others
2. Randomize texts associated with randomly selected irrelevant elements. For example, this can be simply done by replacing the word embedding vector by a random vector. For each state, a subset of the irrelevant elements are randomized with a predefined probability that can be arbitrarily selected (e.g., 50%).
3. Add random offsets to the bounding rectangles for randomly selected critical and irrelevant elements. The probability that the bounding rectangle of a UI element is randomized is arbitrarily picked (e.g., 50%). The offset for critical elements is small while that for irrelevant elements is large.

Example Demonstration from Screenshots

Some failures are difficult to reproduce as they happen randomly with a small probability. Besides, example use cases include real applications on real systems, and the applications remember the previous states. Even for deterministic cases, unless all the operations of the previous states are recorded, there is no guarantee that an exact scenario can be reproduced.

Fortunately, screenshots for those failures are easily available as they are saved during evaluation. Therefore, some example systems can collect demonstrations from individual screenshots to cover those rare cases.

There are a few disadvantages. Actions selected for a screenshot are difficult to validate on an emulator, hence can be wrong, as the screenshot is not reproduced on the emulator. There is no transition between steps as in typical reinforcement learning trajectories. Besides no effort to reproduce, another advantage for screenshot demonstrations is that it only needs human corrections for failed screenshots, not the whole episode.

For behavior cloning, there is no required change to accommodate screenshot demos, because the neural net predicts actions from screenshots/states. In standard DQfD, there are two types of training samples:

1. Episodes from interaction with an RL environment that produce Q learning loss.
2. Episodes from demonstrations that incur both Q learning loss and classification loss.

Another type of training samples can include screenshot demonstrations that only contribute classification loss.

Example Devices and Systems

Figure 9A:
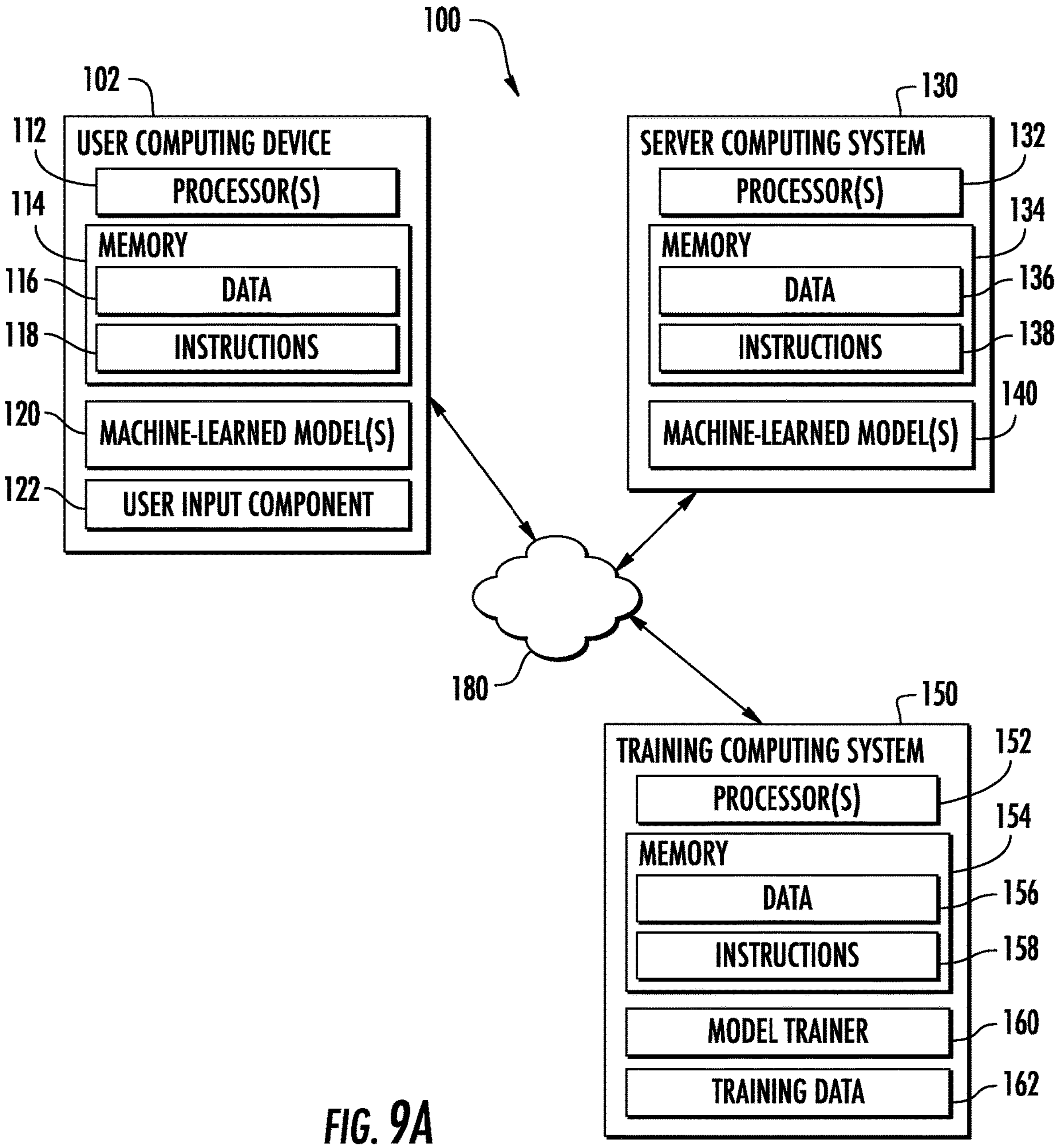
FIG. 9A depicts a block diagram of an example computing system according to example embodiments of the present disclosure.

FIG. 9A depicts a block diagram of an example computing system 100 that performs automated user interface navigation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 1-8.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel user interface navigation across multiple instances of user interfaces).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a user interface navigation service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 1-8F.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150) includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, demonstrations as described herein.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160) includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 9A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 9B:
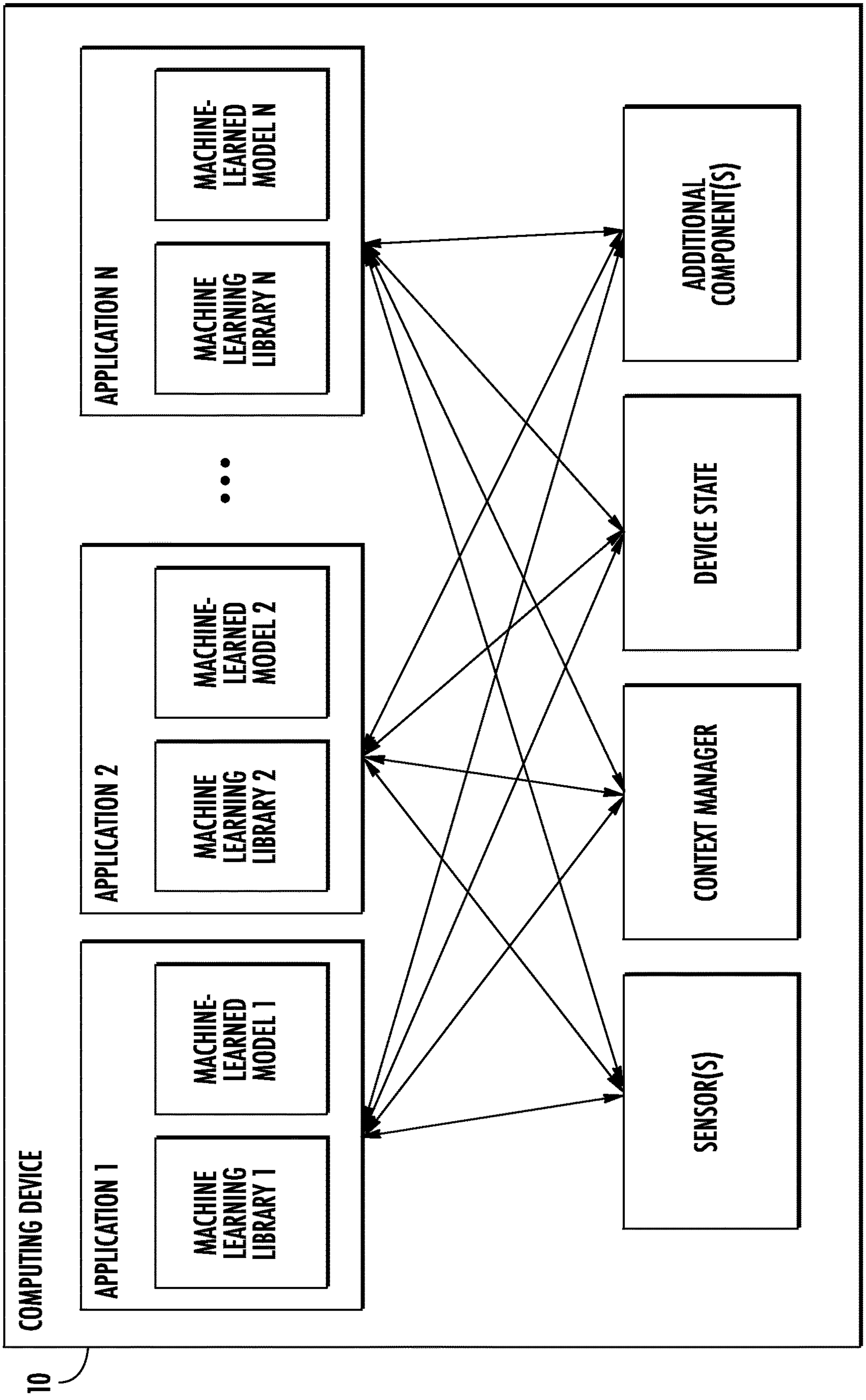
FIG. 9B depicts a block diagram of an example computing device according to example embodiments of the present disclosure.

FIG. 9B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 9B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 9C:
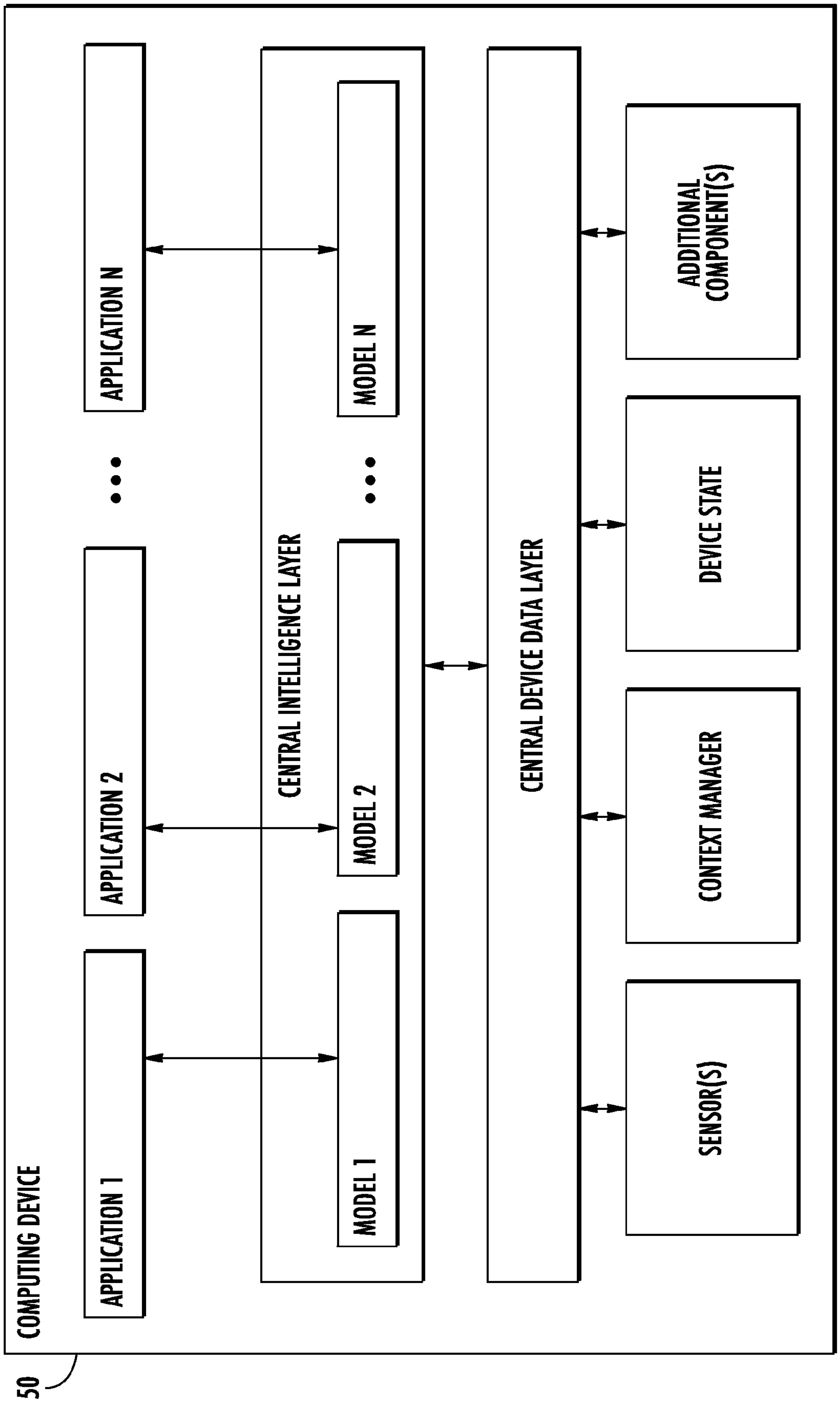
FIG. 9C depicts a block diagram of an example computing device according to example embodiments of the present disclosure.

FIG. 9C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 9C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 9C, the central device data layer can communicate with a number of other components of the computing device, such as, for example, one or more sensors, a context manager, a device state component, and/or additional components. In some implementations, the central device data layer can communicate with each device component using an API (e.g., a private API).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system configured to navigate user interfaces using machine learning, the computing system comprising:

one or more processors; and one or more non-transitory computer-readable media that collectively store instructions that, when executed by the one or more processors, cause the computing system to perform operations, the operations comprising:

obtaining, by the computing system, user interface data descriptive of a user interface that comprises a plurality of user interface elements;

generating, by the computing system and based on the user interface data, a plurality of element embeddings respectively for the plurality of user interface elements;

processing, by the computing system, the plurality of element embeddings with a machine-learned interface navigation model to generate a selected action as an output of the machine-learned interface navigation model, wherein the machine-learned interface navigation model selects the selected action from a predefined action space comprising a plurality of predefined candidate actions, wherein the machine-learned interface navigation model is further configured to receive data descriptive of a query as an input alongside the plurality of element embeddings, wherein the query indicates a desired result of machine interaction with the user interface; and performing, by the computing system, the selected action on the user interface.

2. The computing system of claim 1, wherein the query does not reference any of the plurality of predefined candidate actions.

3. The computing system of claim 1, wherein the query comprises a single instruction, and wherein the computing system is configured to perform a plurality of actions from the predefined action space in response to single instruction.

4. The computing system of claim 1, wherein:

the user interface data comprises imagery that depicts the user interface; and generating, by the computing system, the plurality of element embeddings comprises one or more of the following:

performing optical character recognition on the imagery;

processing the imagery with an icon recognition model; and processing the imagery with an image detection model.

5. The computing system of claim 1, wherein the user interface data comprises structural metadata descriptive of a structure of the user interface.

6. The computing system of claim 1, wherein the selected action comprises a macro action that comprises a sequence of two or more component actions.

7. The computing system of claim 6, wherein the macro action comprises a focus and type action in which an argument is entered into a data entry field of the user interface.

8. The computing system of claim 1, wherein processing, by the computing system, the plurality of element embeddings with the machine-learned interface navigation model to generate the selected action further comprises processing, by the computing system, the plurality of element embeddings with the machine-learned interface navigation model to further generate an element index and an argument as an output of the machine-learned interface navigation model, wherein the element index identifies one of the plurality of user interface elements as a target of the selected action.

9. The computing system of claim 1, wherein the operations further comprise:
- analyzing, by the computing system, the user interface to detect completion of the selected action.

10. The computing system of claim 1, wherein the machine-learned interface navigation model comprises:
- a first attention model configured to perform self-attention on the plurality of element embeddings to generate a plurality of first intermediate embeddings;
- a second attention model configured to perform attention between a query embedding and the plurality of first intermediate embeddings to generate one or more second intermediate embeddings; and
- one or more prediction heads configured to process the one or more second intermediate embeddings to generate one or more predictions, the one or more prediction heads comprising at least an action prediction head configured to select the selected action from the plurality of predefined candidate actions.

11. The computing system of claim 1, wherein the machine-learned interface navigation model comprises a reinforcement learning agent.

12. A computer-implemented method to train a machine-learned interface navigation model to navigate interfaces, the method comprising:
- obtaining, by a computing system comprising one or more computing devices, user interface data descriptive of a user interface that comprises a plurality of user interface elements;
- generating, by the computing system and based on the user interface data, a plurality of element embeddings respectively for the plurality of user interface elements;
- processing, by the computing system, the plurality of element embeddings with the machine-learned interface navigation model to generate a selected action as an output of the machine-learned interface navigation model, wherein the machine-learned interface navigation model selects the selected action from a predefined action space comprising a plurality of predefined candidate actions, wherein the machine-learned interface navigation model is further configured to receive data descriptive of a query as an input alongside the plurality of element embeddings, wherein the query indicates a desired result of machine interaction with the user interface;
- determining, by the computing system, a reward based at least in part on the selected action; and
- modifying, by the computing system, one or more values of one or more parameters of the machine-learned interface navigation model based at least in part on the reward.

13. The computer-implemented method of claim 12, wherein the query corresponds to a user utterance.

14. The computer-implemented method of claim 12, wherein the selected action comprises a macro action that comprises a sequence of two or more component actions.

15. The computer-implemented method of claim 12 wherein:
- processing, by the computing system, the plurality of element embeddings with the machine-learned interface navigation model to generate the selected action further comprises processing, by the computing system, the plurality of element embeddings with the machine-learned interface navigation model to further generate an element index and an argument as an output of the machine-learned interface navigation model, wherein the element index identifies one of the plurality of user interface elements as a target of the selected action; and
- performing, by the computing system, the selected action comprises performing the selected action on the identified user interface element in accordance with the argument.

16. The computer-implemented method of claim 12, wherein the user interface data comprises augmented user interface data generated by performance of one or more augmentation operations on existing user interface training data.

17. The computer-implemented method of claim 16, wherein the one or more augmentation operations comprise:
- modifying texts or locations of one or more user interface elements that have been classified as irrelevant.

18. The computer-implemented method of claim 12, wherein determining, by the computing system, a reward based at least in part on the selected action comprises comparing, by the computing system, the selected action to a demonstration action that was included in a human demonstration.

19. The computer-implemented method of claim 12, wherein determining, by the computing system, the reward based at least in part on the selected action comprises determining, by the computing system, whether or not to mask an element index loss term or an argument loss term based at least in part on an action type.

20. A computer-implemented method comprising:
- obtaining, by a computing system, user interface data descriptive of a user interface that comprises a plurality of user interface elements;
- generating, by the computing system and based on the user interface data, a plurality of element embeddings respectively for the plurality of user interface elements;
- processing, by the computing system, the plurality of element embeddings with a machine-learned interface navigation model to generate a selected action as an output of the machine-learned interface navigation model, wherein the machine-learned interface navigation model selects the selected action from a predefined action space comprising a plurality of predefined candidate actions, wherein the machine-learned interface navigation model is further configured to receive data descriptive of a query as an input alongside the plurality of element embeddings, wherein the query indicates a desired result of machine interaction with the user interface; and
- performing, by the computing system, the selected action on the user interface.

* * * * *